E. P. BULLARD, Jr.
CENTER STOP FOR MACHINE TOOLS.
APPLICATION FILED SEPT. 20, 1911.
1,059,655.
Patented Apr. 22, 1913.
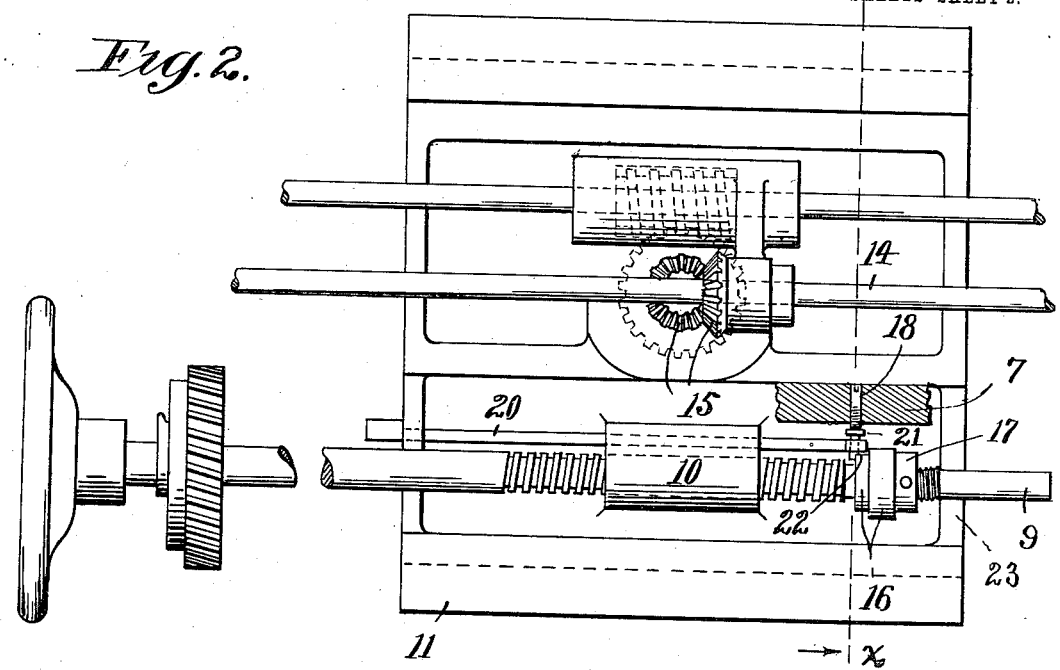
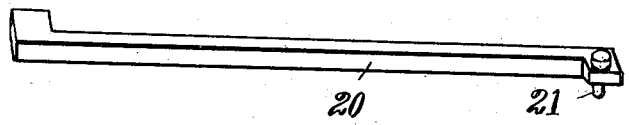
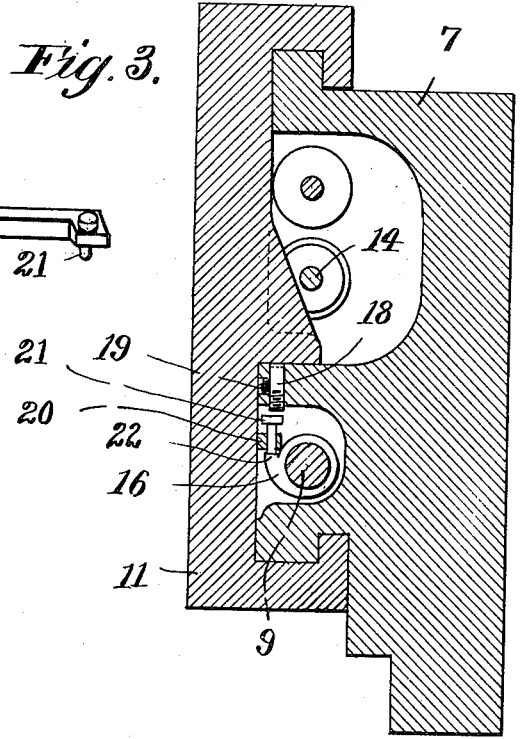
WITNESSES:
INVENTOR
Edward P. Bullard Jr
BY
Chamberlain & Newman
ATTORNEYS

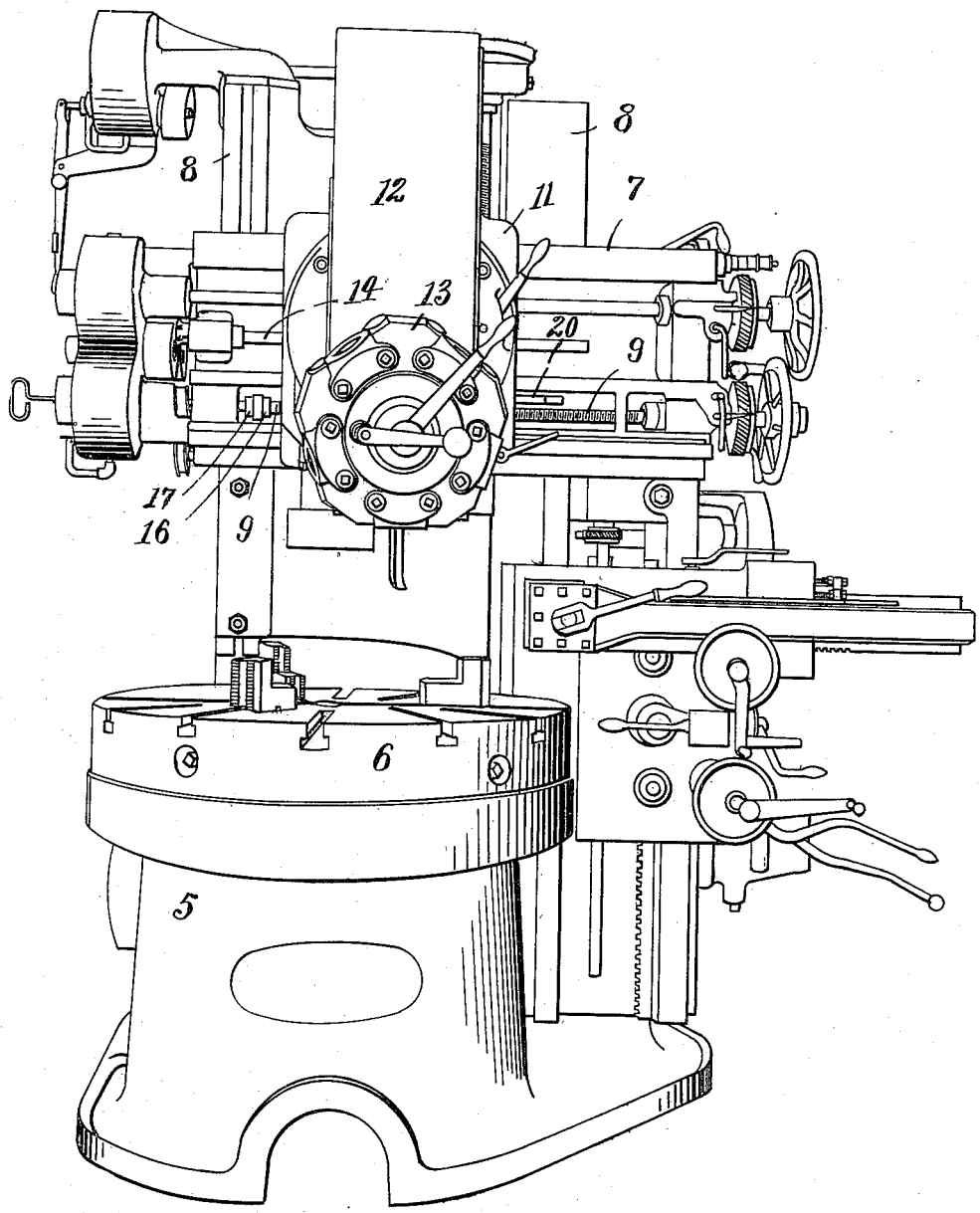

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

CENTER-STOP FOR MACHINE-TOOLS.

1,059,655.      Specification of Letters Patent.      Patented Apr. 22, 1913.

Application filed September 20, 1911. Serial No. 650,408.

*To all whom it may concern:*

Be it known that I, EDWARD P. BULLARD, Jr., citizen of the United States, and resident of Bridgeport, in the county of Fairfield and State of Connecticut, have invented certain new and useful Improvements in Center-Stops for Machine-Tools, of which the following is a specification.

This invention relates to improvements in boring mills, maxi-mills, vertical turret lathes, horizontal lathes, and the like, and refers particularly to what I term a center stop, that is, means whereby the cutting tool of the machine may be brought to the center and accurately set in relation to the center of the table spindle. In machines of this sort, having a rotary work carrying table, a turret head, slide, saddle and feed mechanism whereby the tool may be adjusted both vertically and horizontally, it is highly important that a definite, accurate and reliable center stop be provided whereby the tool carried by the head may be brought back to and set in the center, with relation to the table, at the beginning of each important operation, therefore it is the purpose of my invention to provide and construct such mechanism, so that the position of its successive settings will not vary, and further to provide said center stop for the main tool head of a machine, so that it may be shifted, if desired to permit the said head to be carried beyond the center a few inches on special occasions, and finally to construct the said mechanism in a unique manner so that it will not inherit the weakness and consequent inaccuracy of the present forms of center stops.

The nature and scope of my invention will be more fully understood from the following description, taken in conjunction with the accompanying two sheets of drawings, forming part hereof, and in which, Figure 1, shows a front perspective view of a modern Bullard vertical turret lathe, having my improved center stop mechanism applied thereto. Fig. 2, is a detached rear elevation of the saddle attached to the cross rail of the machine shown in Fig. 1 and illustrating my improved center stop mechanism attached thereto. Fig. 3, shows a vertical cross section through the cross rail, saddle and center stop mechanism heretofore referred to and taken on line $x$. of Fig. 2—and, Fig. 4, shows a detached perspective view of the adjustable rod and stop pin carried thereby.

Referring in detail to the characters of reference marked upon the drawings 5 will be found to designate the main frame of the machine, 6 the table, 7 a cross rail which is adjustable vertically upon the uprights 8 of the frame of the machine. A feed screw 9 is operatively mounted in the cross rail and is made to threadably engage a lug 10 on the rear of the saddle 11 and whereby the saddle together with its slide 12 and turret head 13 are made to move horizontally upon the ways of the rail. A further longitudinal shaft 14 is also operatively mounted in the said cross rail and is connected by the beveled pinions 15 with a shaft and gear for raising and lowering the before mentioned slide 12 and the head 13 carried thereon. By these two trains of mechanism the said turret head and its tool are adapted to be raised and lowered and then fed horizontally and automatically along the surface of a piece of work when mounted upon the table, and whereby the same may be finished. This mechanism is designed to feed the said turret head and its tool from left to right, usually beginning at the center of the work, that is, in line with the center or axis of rotation of the said table 6. My improvements therefore include a special form of mechanism for positively determining the proper center position for the said turret head so that whether the same is run in, quick or slow, it will be positively caught and stopped in absolutely the same relative position every time. This mechanism includes the securing of a shouldered collar 16 upon the before mentioned feed screw 9 which collar may be threadably attached to the said screw and secured in such position by means of a nut 17 as shown in Figs. 1 and 2 of the drawings.

A stop screw 18 is arranged vertically in the outer end portion of the intermediate or center bearing of the cross rail, and is adapted to be adjusted vertically by the use of a screw driver and then set and secured in position by a second and smaller set screw 19 and is also shown in Fig. 3. This adjustment is for accurately setting the parts to stop at a particular time and place, as for instance, directly over the center of the rotary table.

A slide rod 20 is adjustably mounted in the before mentioned lug 10 and in the outer flange of the saddle thus being adapted to be shoved backward and forward as occasion may require. One end of this slide is slightly enlarged and provided with a vertical hole therethrough to receive a pin 21 which is loosely seated therein and thus carried by the slide rod. Therefore when it is necessary to set the device so that the tools will stop over the center of the table this rod is shoved into the position shown in Fig. 2. This insures the alinement of the before mentioned pin 21, with the end of the adjustable stop screw 18, so that when the screw has been sufficiently turned and the saddle accordingly moved thereon its slide 20 will also have been moved so that its pin 21 will be brought forward in position between pin and collar, the shouldered face 22 of the collar 16 will thus strike against the underside of the pin with its next rotation and throw it up against the lower end of the screw 18, which being a positively fixed member serves to accurately stop the movement of the slide and screw. On the other hand if it be desirable to run the saddle past the center, the slide rod is slipped out or to the left as shown in Fig. 2 bringing the pin out of alinement with the collar and stop screw, thereby allowing the saddle to run past for a short distance, and until the side web 23 of saddle strikes the side of nut 17 on screw 9.

Having thus described my invention what I claim and desire to secure by Letters Patent is:

1. A center stop for machine tools, comprising a cross rail, a feed screw mounted in the cross rail, a shouldered collar upon the feed screw, means adapted to be interposed between the collar of the feed screw and a fixed portion of the cross rail to stop the rotary movement of the screw.

2. In a center stop for machine tools, the combination with a cross rail, a feed screw and saddle mounted in the cross rail, of a shouldered collar mounted upon the feed screw, a slide rod mounted in the saddle and adapted to be interposed between the collar of the feed screw and the relatively fixed portion of the cross rail to stop the movement of the screw and saddle.

3. In a center stop for machine tools, the combination with a rotary table, a cross rail, a feed screw and saddle mounted in the cross rail, of a shouldered collar upon the feed screw, means adapted to be set with relation to the saddle and be moved therewith against the collar on the feed screw to stop the movement of the saddle when it reaches the central point of the rotary table.

4. In a center stop for machine tools, the combination with a cross rail, a feed screw and saddle mounted in the cross rail, of a shouldered collar mounted upon the feed screw, a slide rod mounted in the saddle, a pin in the rod adapted to be interposed between the collar of the feed screw and the cross rail to stop the movement of the screw and saddle.

5. In a center stop for machine tools, the combination with a cross rail, a feed screw and saddle mounted on the cross rail, of a shouldered collar upon the feed screw, a slide rod mounted in the saddle and adapted to be interposed between the collar of the feed screw and the relatively fixed portion of the cross rail to stop the movement of the screw and saddle, and adjustable means for varying the point of such engagement and stoppage of the screw and saddle.

Signed at Bridgeport in the county of Fairfield and State of Conn. this fifteenth day of September, A. D., 1911.

EDWARD P. BULLARD, Jr.

Witnesses:
W. J. LYNCH,
L. C. EISENMAN.